US012671625B2

(12) United States Patent
Lawrence et al.

(10) Patent No.: US 12,671,625 B2
(45) Date of Patent: Jun. 30, 2026

(54) INTELLIGENT MANAGEMENT OF REARRANGED SERVERS IN A DATA PROCESSING SYSTEM

(71) Applicant: OBM, Inc., Baltimore, MD (US)

(72) Inventors: Daniel Lawrence, Sparrows Point, MD (US); Jacob Luers, Baltimore, MD (US)

(73) Assignee: OBM, Inc., Baltimore, MD (US)

( * ) Notice: Subject to any disclaimer, the term of this patent is extended or adjusted under 35 U.S.C. 154(b) by 90 days.

(21) Appl. No.: 18/763,422

(22) Filed: Jul. 3, 2024

(65) Prior Publication Data

US 2026/0012390 A1     Jan. 8, 2026

(51) Int. Cl.
| | |
|---|---|
| *H04L 41/0816* | (2022.01) |
| *H04L 12/18* | (2006.01) |
| *H04L 43/04* | (2022.01) |
| *H04L 43/045* | (2022.01) |
| *H04L 67/104* | (2022.01) |

(52) U.S. Cl.
CPC ...... *H04L 41/0816* (2013.01); *H04L 12/1845* (2013.01); *H04L 43/04* (2013.01); *H04L 43/045* (2013.01); *H04L 67/1046* (2013.01)

(58) Field of Classification Search
CPC . H04L 41/0816; H04L 12/1845; H04L 43/04; H04L 67/1046
See application file for complete search history.

(56) References Cited

U.S. PATENT DOCUMENTS

| | | | | |
|---|---|---|---|---|
| 10,747,281 B1 * | 8/2020 | Trim | ..................... | H04N 7/181 |
| 11,165,655 B1 * | 11/2021 | Lairsey | .................. | H04L 41/12 |
| 11,677,621 B2 * | 6/2023 | NagarajeGowda | ... | H04L 41/145 |
| | | | | 709/224 |
| 12,224,909 B2 * | 2/2025 | Cockrell | ................. | H04L 41/12 |
| 2009/0327778 A1 * | 12/2009 | Shiga | .................... | G06F 1/3203 |
| | | | | 713/320 |
| 2010/0138530 A1 * | 6/2010 | Brillhart | ............... | G06F 9/4856 |
| | | | | 709/224 |
| 2010/0217454 A1 * | 8/2010 | Spiers | ................ | H05K 7/20836 |
| | | | | 713/320 |
| 2011/0016342 A1 * | 1/2011 | Rowan | ................ | G06F 11/3062 |
| | | | | 713/340 |
| 2014/0184649 A1 * | 7/2014 | Bak | ........................ | G06T 11/206 |
| | | | | 345/660 |
| 2017/0086325 A1 * | 3/2017 | Connor | ................ | H05K 7/1488 |
| 2021/0073449 A1 * | 3/2021 | Segev | .................... | G06F 30/27 |

* cited by examiner

*Primary Examiner* — Jerry B Dennison

(74) *Attorney, Agent, or Firm* — Womble Bond Dickinson (US) LLP

(57) ABSTRACT

A system and method of managing configurations of rearranged servers in a data processing system (DPS). The method includes acquiring infrastructure data associated with a DPS including a first group of servers being monitored by a first group of sensors that generate a first set of sensor data and a second group of servers being monitored by a second group of sensors that generate a second set of sensor data. The method includes querying the DPS to acquire a plurality of network addresses associated with the first group of servers and the second group of servers. The method includes identifying a plurality of DPS locations of the first group of servers and the second group of servers. The method includes generating, based on the plurality of DPS locations, a server location map of the first group of servers and the second group of servers in the DPS.

19 Claims, 4 Drawing Sheets

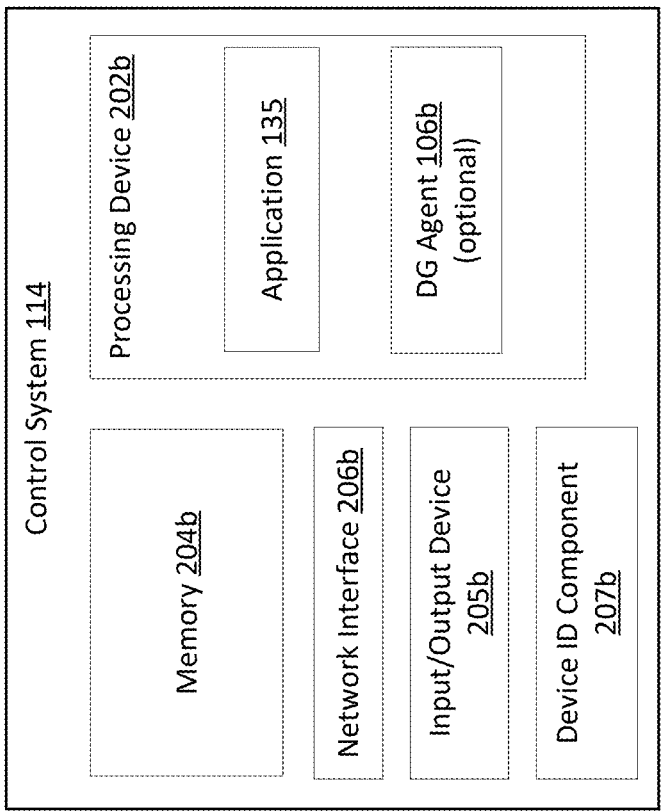

FIG. 2B

Control System 114

Processing Device 202b

Application 135

DG Agent 106b
(optional)

Memory 204b

Network Interface 206b

Input/Output Device 205b

Device ID Component 207b

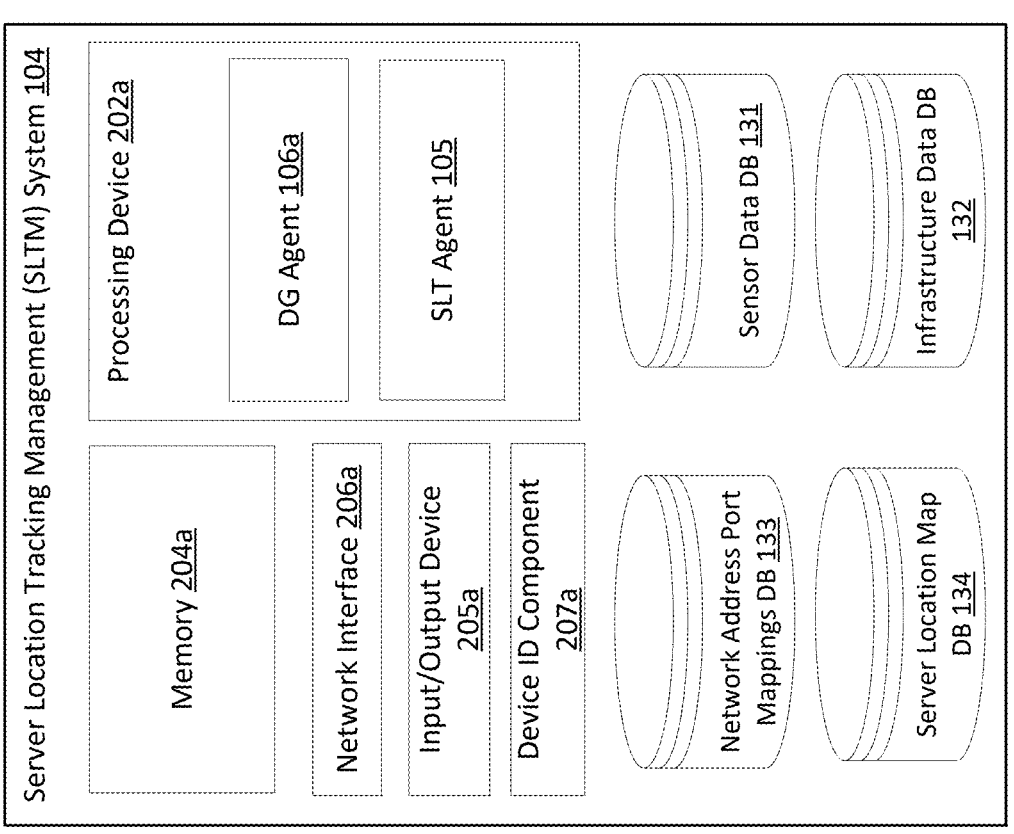

FIG. 2A

Server Location Tracking Management (SLTM) System 104

Processing Device 202a

DG Agent 106a

SLT Agent 105

Memory 204a

Network Interface 206a

Input/Output Device 205a

Device ID Component 207a

Sensor Data DB 131

Infrastructure Data DB 132

Network Address Port Mappings DB 133

Server Location Map DB 134

300 acquiring infrastructure data associated with a DPS comprising a first group of servers being monitored by a first group of sensors that generate a first set of sensor data and a second group of servers being monitored by a second group of sensors that generate a second set of sensor data
302 querying the DPS to acquire a plurality of network addresses  associated with the first group of servers and the second group of servers
304 identifying, by a processing device based on the infrastructure data and the plurality of network addresses, a plurality of DPS locations of the first group of servers and the second group of servers
306 generating, based on the plurality of DPS locations, a server location map of the first group of servers and the second group of servers in the DPS, the server location map associates the first group of servers with the first set of sensor data and the second group of servers with the second set of sensor data
308

FIG. 3

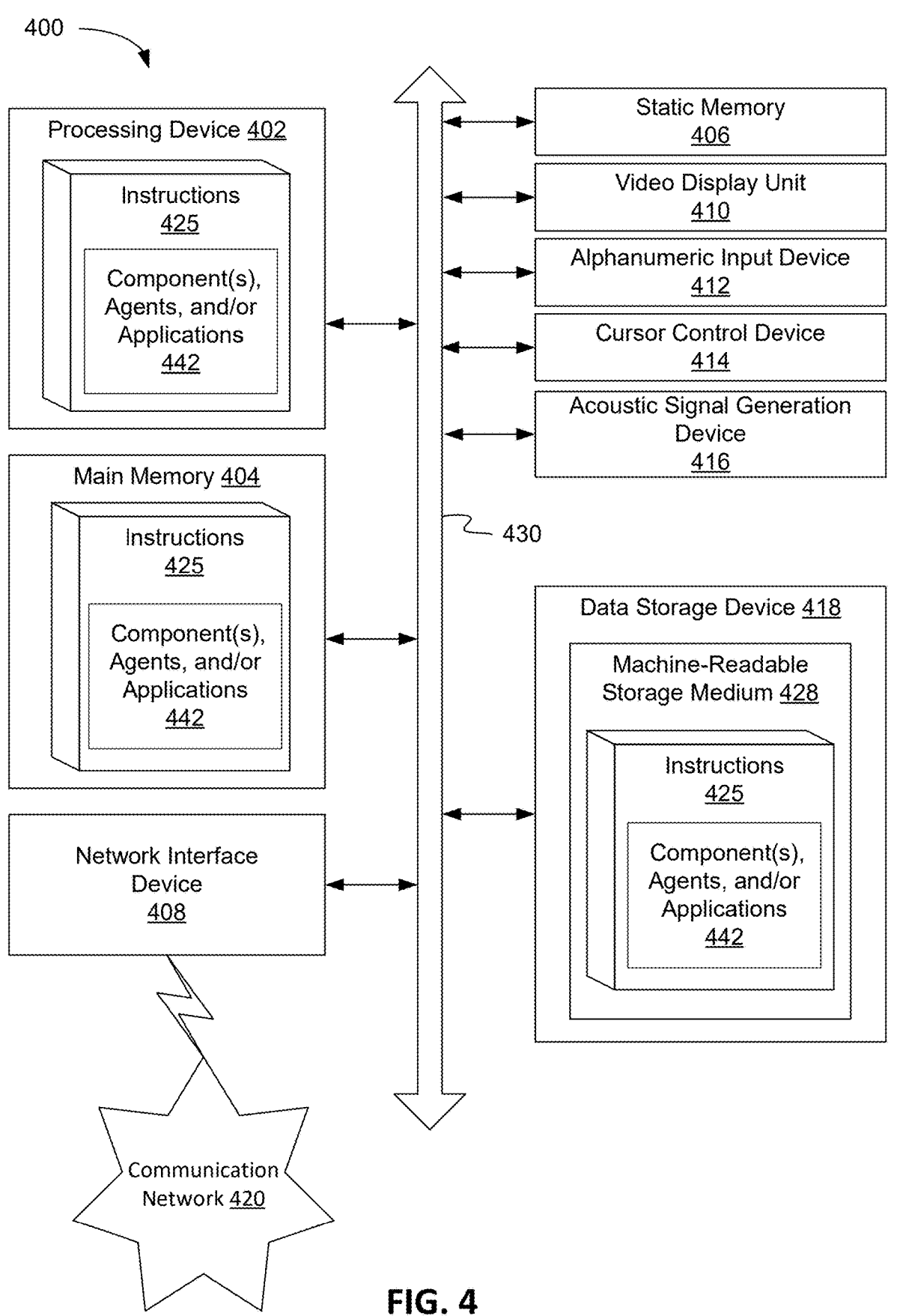

400

Processing Device 402

Instructions
425

Component(s),
Agents, and/or
Applications
442

Main Memory 404

Instructions
425

Component(s),
Agents, and/or
Applications
442

Network Interface
Device
408

Communication
Network 420

430

Static Memory
406

Video Display Unit
410

Alphanumeric Input Device
412

Cursor Control Device
414

Acoustic Signal Generation
Device
416

Data Storage Device 418

Machine-Readable
Storage Medium 428

Instructions
425

Component(s),
Agents, and/or
Applications
442

FIG. 4

INTELLIGENT MANAGEMENT OF REARRANGED SERVERS IN A DATA PROCESSING SYSTEM

TECHNICAL FIELD

The present disclosure relates generally to data processing, and more particularly, to systems and methods of the intelligent management of rearranged servers in a data processing system.

BACKGROUND

Data processing systems (DPS) are designed to connect businesses globally across many different workloads and unlock seamless data collaboration. One example of a data processing system is a data store or data warehouse, which are enterprise systems used for the analysis and reporting of structured and semi-structured data from multiple sources. Devices may use a data processing system for processing and storing data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A is a block diagram depicting an example of the server location tracking management system of the environment in FIG. 1, according to some embodiments;

FIG. 2B is a block diagram depicting an example of the control system of the environment in FIG. 1, according to some embodiments;

FIG. 3 is a flow diagram depicting a method of managing configurations of rearranged servers in a data processing system, according to some embodiments; and FIG. 4 is a block diagram of an example computing device that may perform one or more of the operations described herein, in accordance with some embodiments.

DETAILED DESCRIPTION

Figure 1:
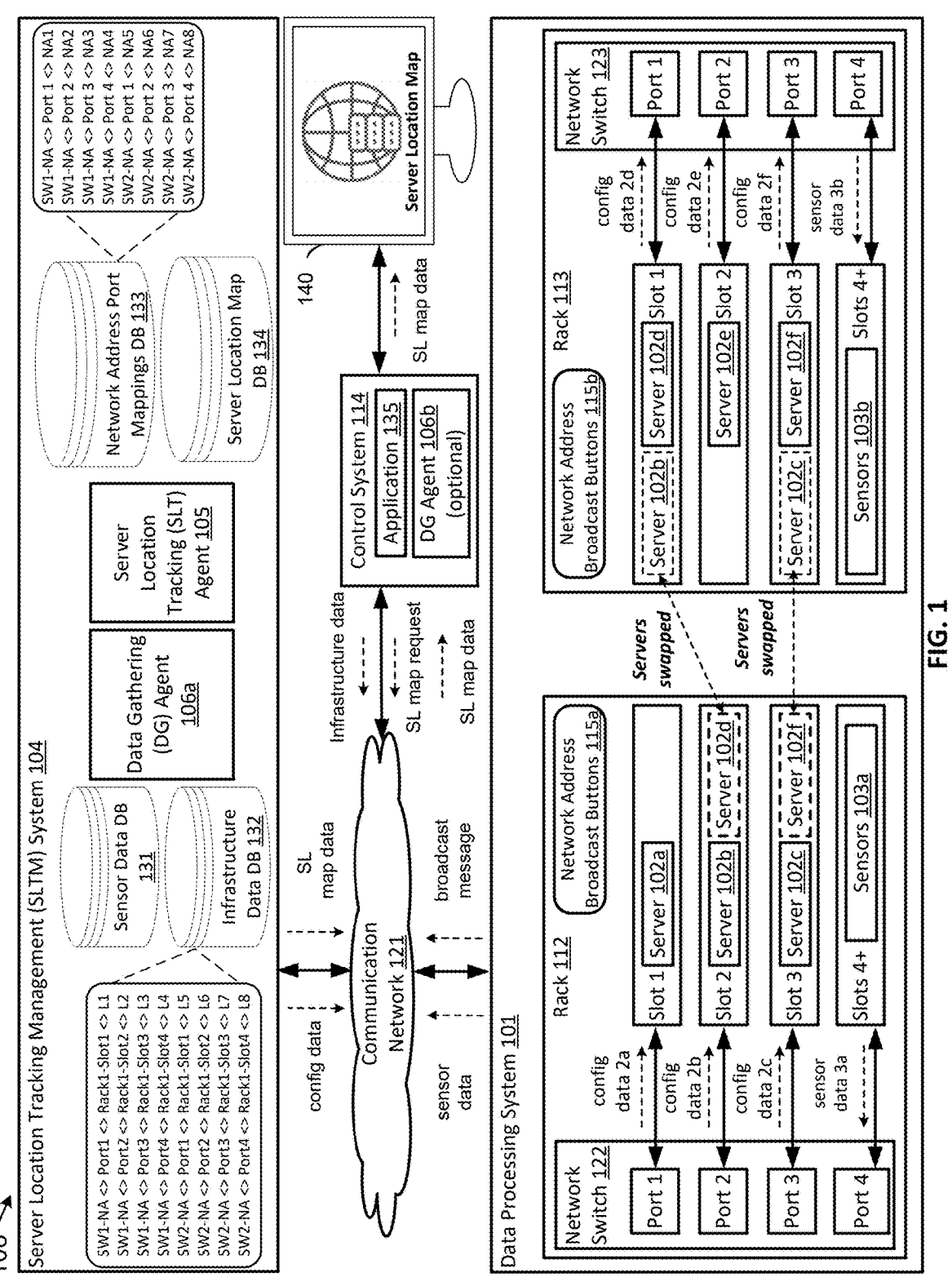
FIG. 1 is a block diagram depicting an example environment for managing configurations of rearranged servers in a data processing system, according to some embodiments.

Data processing systems includes multiple servers that are positioned on server racks inside buildings, containers, etc. Each of the servers are configured to process tasks and/or queries using database data that is stored local or remote databases. Sensors, such as temperature, power and humidity may be used to monitor the performance of each server and the environmental conditions surrounding the servers. The reason for this is that a server generates heat when processing queries—i.e., the more processing intensive the query, then the more heat that is generated when processing the query. An administrator of a conventional data processing system might use cooling units (e.g., fans, water cooling units) to maintain a steady temperature surrounding the servers, and for this reason, the administrator of the conventional system has no reason to rearrange the servers in the data processing system due to the heat. Thus, once a data processing system is configured, the administrator keeps the server layout fixed during the lifetime of the servers.

However, there are particular types of data processing activities that demand excessive computing power to process, which in turn, can cause the servers to overheat even though external cooling units are trying to control the server temperature. An example of a data processing type that can overburden a server is cryptocurrency mining, which is the process used to generate new coins and verify new transactions for a blockchain. This process is CPU-intensive because it demands for the server to repeatedly solve difficult algorithms by repeatedly generating a random hash value from extremely large numbers.

Therefore, administrators of data processing systems that perform cryptocurrency mining often rearrange the positioning of the servers in the data processing system to optimize the environmental conditions for each server. This ensures that each of the servers are able to perform optimally and efficiently. This rearrangement of the servers, however, makes it impossible for any computing devices (e.g., customers, administrators, etc.) that are connected to the data processing system to know where the servers have been moved to in the data processing system. It also disconnects the servers from the sensors that monitor them, which prevents an administrator from being able to further monitor the performance of the servers. Without being able to monitor their performance, an administrator is unable to ensure that the servers are running optimally and efficiently. Thus, there is a long felt need to solve the problem related to managing rearranged servers in a data processing system.

Aspects of the present disclosure address the above-noted and other deficiencies by managing configurations of rearranged servers in a data processing system (DPS) for improving the performance and/or efficiency of the servers to process data. The present disclosure provides a server location tracking management (SLTM) system that is communicatively coupled to a data processing system and a control system, which executes an application (sometimes referred to as Foreman). Using the application, the user creates a map that contains locations for the servers in a data processing system. The user also uploads infrastructure data to the application, where the infrastructure data describes the devices (e.g., servers, network switches, sensors, etc.) that are included in the data processing system. The user associates each port of the network switches by a location in the map. That is, the user adds all servers on the network switches via the application. The application sends all information to the SLTM system. The SLTM system and/or the application continuously queries all servers in the data processing system for health-related information. The SLTM system and/or the application continuously queries all added infrastructure (e.g., network switch). The SLTM system uses the infrastructure statistics to determine the network address (e.g., Media Access Control (MAC) address) of the devices (e.g., servers, sensors) that are connected to each port of the network switches. The SLTM system knows the network address associated with each port and knows where each server is located. The SLTM system automatically positions the server into the map. If the user also added sensors (e.g., temperature sensor, a power sensor) to the infrastructure of the data processing system, then the SLTM system queries the sensors for their sensor data that they generated by monitoring the servers. The SLTM system may automatically use the sensor data to determine whether a server should be relocated to a different area of the data processing system and reconfigured for the new area, so to improve the performance and/or efficiency of the server to process data.

Thus, the SLTM system is able to continuously monitor the servers of a data processing system to track their performance and locations and reconfigure the servers if they are move to other locations in the data processing system, so to ensure that the servers are able to perform optimally and efficiently.

In an illustrative embodiment, a server location tracking management (SLTM) system acquires (e.g., retrieves or receives) infrastructure data that is associated with a data processing system. The data processing system includes a first group (e.g., one or more) of servers that are being monitored (e.g., tracked) by a first group of sensors (e.g., temperature sensors, power sensors, airflow sensors, and/or the like) that generate a first set of sensor data and a second group of servers that are being monitored by a second group of sensors that generate a second set of sensor data. The SLTM system queries the data processing system to acquire a plurality of network addresses that are associated with the first group of servers and the second group of servers. The SLTM system identifies, based on the infrastructure data and the plurality of network addresses, a plurality of data processing system locations of the first group of servers and the second group of servers. The SLTM system generates, based on the plurality of data processing system locations, a server location map of the first group of servers and the second group of servers in the data processing system. The server location map associates (e.g., links, connects) the first group of servers with the first set of sensor data and the second group of servers with the second set of sensor data.

FIG. 1 is a block diagram depicting an example environment for managing configurations of rearranged servers in a data processing system, according to some embodiments. The environment 100 includes an SLTM 104, a data processing system 101, and a control system 114 that are each communicably coupled together via a communication network 121. The data processing system 101 includes servers 102 (e.g., server 102a, server 102b, server 102c, server 102d, server 102e, server 102f, and server 102g), sensors 103 (e.g., sensor 103a and sensors 103b). The data processing system 101 also includes network switches 122, 123 (e.g., switching hub bridging hub, Media Access Control (MAC) bridge, and/or the like) that each include a plurality of ports (e.g., channels) for communicating with one or more devices on a computer network (e.g., communication network 121 and/or a private network within the data processing system 101). The control system 114 includes and/or executes an application 135 (sometimes referred to as Foreman) for exchanging data (e.g., infrastructure data, SL map request, SL map data, etc.) between the data processing system 101 and the SLTM system 104, and to generate SL map data indicating server locations (e.g., slots number, slot positioning in a rack, positions in the data processing system 101, and/or global positioning information) and corresponding sensor data.

The SLTM system 104 includes and/or executes a data gathering (DG) agent 106a, a server location tracking (SLT) agent 105, a sensor data database (DB) 131, an infrastructure data DB 132, a network address port mappings DB 133, and a server location map DB 134. In some embodiments, the sensor data DB 131, the infrastructure data DB 132, the network address port mappings DB 133, and the server location map DB 134 may be combined into fewer databases, such as 1, 2, or 3 databases. In some embodiments, the DG agent 106a and the SLT agent 105 may be a single component that includes the same features and functionality of both the DG agent 106a and the SLT agent 105. The SLTM system 104 may be geographically local to the data processing system 101. However, in other embodiments, one or more of the components (e.g., sensor data DB 131, infrastructure data DB 132, DG agent 106a, SLT agent 105, network address port mapping DB, server location map DB 134) of the SLTM system 104 may be implemented by a cloud system.

Each of the databases (e.g., the sensor DB 131, the infrastructure data DB 132, the network address port mappings DB 133, and the server location map DB 134) may be a physical database or a logical data structure (e.g., table) stored in memory.

The data processing system 101 includes a rack 112 (e.g., server rack, cabinet) that includes a plurality of slots that are each configured to store one or more devices that are communicatively coupled to a dedicated port of the network switch 122. Specifically, slot 1 of rack 112 stores (e.g., holds) server 102a which is communicatively coupled to port 1 of network switch 122, slot 2 of rack 112 stores server 102b which is communicatively coupled to port 2 of network switch 122, slot 3 of rack 112 stores server 102c which is communicatively coupled to port 3 of network switch 122, and slot 4 stores a first sensor 103a which is communicatively coupled to port 4 of network switch 122. Additional slots (e.g., slot 5, slot 6, etc.) of rack 112 may store additional sensors 103 that are each communicatively coupled to a dedicated port of the network switch 122.

As shown in FIG. 1, slot 1 in rack 112 is positioned above slot 2 in rack 112, which is positioned above slot 3 in rack 112, which is positioned above slot 4 in rack 112, and so on. Similarly, slot 1 in rack 113 is positioned above slot 2 in rack 113, which is positioned above slot 3 in rack 113, which is positioned above slot 4 in rack 113, and so on. The rack 112 and the rack 113 may be positioned in any combination of positions within the data processing system 101. In some embodiments, both racks 112, 113 may be positioned adjacent or side-by-side to one another in the data processing system 101, such that they share the same environmental conditions in the data processing system 101. For example, both racks 112, 113 may be positioned in a corner of the data processing system 101 where there is little cooling airflow, thereby, causing the servers 102 on both racks 112, 113 to operate at degraded performance and/or efficiencies due to high operating temperatures.

In some embodiments, rack 112 may be physically separated from rack 113 by a large distance (e.g., greater than 10 feet, 20 feet, or 30 feet, etc.), such that each rack is exposed to different environmental conditions in the data processing system 101, thereby exposing their respective servers to the different environmental conditions. For example, rack 112 may be positioned in a first corner of the data processing system 101 where there is little cooling airflow, while rack 113 may be positioned in the center of the data processing system 101 where there is strong cooling airflow. As a result, the servers on rack 112 operate at a degraded performance and/or efficiency due to their high operating temperatures, while the servers on rack 113 operate at an optimal performance and/or efficiency because their operating temperatures are well-maintained by the cooling airflow.

Furthermore, the stacking of the slots in a rack could also create a situation where the performance and/or efficiency of a particular server 102 can depend, to at least some extent, on whether that server 102 is placed in a slot that is adjacent to two neighboring slots or only one neighboring slot. If the server has only one neighboring slot, then the server is exposed to the heat generated by only one neighboring server. Conversely, if the server has two neighboring slots, then the server is exposed to the heat generated by the two neighboring servers that sit in those two slots. For example, server 102a in slot 1 of rack 112 is exposed to the heat that is generated by only one server—e.g., server 102b in slot 2 because slot 2 is directly below slot 1. However, server 102b in slot 2 of rack 112 is exposed to the heat generated by two servers—e.g., server 102a in slot 1 and server 102c in slot 3.

The data processing system 101 includes a rack 113 that contains of a plurality of slots that are each configured to store one or more devices that are communicatively coupled to a dedicated port of the network switch 122. Specifically, slot 1 of rack 113 stores server 102d which is communicatively coupled to port 1 of network switch 123, slot 2 of rack 113 stores server 102e which is communicatively coupled to port 2 of network switch 123, slot 3 of rack 113 stores server 102f which is communicatively coupled to port 3 of network switch 123, and slot 4 stores a first sensor 103ba which is communicatively coupled to port 1 of network switch 123. Additional slots (e.g., slot 5, slot 6, etc.) of rack 113 may store additional sensors 103 that are each communicatively coupled to a dedicated port of the network switch 123.

One or more sensors 103a may be configured to monitor the performance (e.g., central processing unit (CPU) temperature, power consumption, etc.) of the servers of rack 112 and generate sensor data (e.g., server health data) that is indicative of the performance. Likewise, one or more sensors 103b may be configured to monitor the performance of the servers of rack 113 and generate sensor data that is indicative of the performance and the environmental conditions. To do this, each sensor 103 includes a plurality of channels that are each coupled to a respective server of a slot of a rack. Specifically, with regard to rack 112, a first channel of sensor 103a (e.g., temperature sensor) is coupled to server 102a, a second channel of sensor 103a is coupled to server 102b, a third channel of sensor 103a is coupled to server 102c. Likewise, with regard to rack 113, a first channel of sensor 103b is coupled to server 102d, a second channel of sensor 103b is coupled to server 102e, a third channel of sensor 103b is coupled to server 102f.

This connection configuration may be repeated for additional sensors 103a. For example, a first channel of a second sensor 103a (e.g., power distribution unit (PDU)/power sensor) may also be coupled to server 102a, a second channel of the second sensor 103b may also be coupled to server 102b, and a third channel of the second sensor 103b may also be coupled to server 102c. Likewise, with regard to rack 113, a first channel of sensor 103b (e.g., temperature sensor) may also be coupled to server 102d, a second channel of sensor 103b may also be coupled to server 102e, a third channel of sensor 103b may also be coupled to server 102f.

One or more sensors 103 may also be configured to monitor the environmental conditions (e.g., ambient temperature, moisture level, airflow, etc.) surrounding the servers on a particular rack (e.g., rack 112, rack 113) and generate sensor data that is indicative of the environmental conditions. For example, a first sensor 103a may be a temperature sensor that measures the ambient temperature surrounding the rack 112, a second sensor 103b may be a power sensor that measures the overall power (which provides power to each of the servers 102a-c of the rack 112) that is provided to the rack 112, a third sensor 103a may be a humidity sensor that measures the humidity/moisture level surrounding the rack 112.

Each of the sensors 103 may be configured to provide their respective sensor data to the SLTM 104 or the control system 114 via the communication network 121. In some embodiments, the SLTM 104 or the control system 114 (via their respective DG agent 106) may deploy a script (e.g., a computer program) onto each of the servers 102 by sending (e.g., broadcasting) messages to the servers 102a-102c of rack 112 and the servers 102d-102f of rack 113. Upon receiving the messages, each of the servers 102 install and execute the script, which causes the server 102 to periodically (e.g., every 1, 2, or 5 minutes, etc.) read the sensor data from each of the sensors 103 that are coupled to the server 102 and send the sensor data to the DG agent 106a of the SLTM 104.

In some embodiments, the SLTM 104 or the control system 114 (via their respective DG agent 106) may be configured to continuously or periodically (e.g., every 1, 2, or 5 minutes, etc.) query each of the servers 102 for their locally stored sensor data.

That is, the communication network 121 is configured to carry/transfer both sensor data and other communication data (e.g., infrastructure data, SL map data, config data, etc.). However, in some embodiments, the servers 102 or sensors 103 may send their respective sensor data to the SLTM system 104 and/or control system 114 via a second communication network 121 (sometimes referred to as, "sensor communication network") that is configured to exclusively carry/transfer the sensor data, while all other communication (e.g., infrastructure data, SL map data, config data, etc.) is transferred between the computing devices (e.g., SLTM system 104, servers 102, control system 114) using the first communication network 121.

In some embodiments, SLTM system 104 relies on an on-site (e.g., physically proximate to the data processing system 101) computing device that is responsible for gathering the sensor data from the data processing system 101 and forwarding the sensor data to the SLTM system 104. Specifically, the control system 114 may execute a DG agent 106b that includes the same features and functionality as the DG agent 106a of SLTM system 104. The application 135 uses the DG agent 106b to acquire (e.g., receive or retrieve) the sensor data from the sensors 103a and/or servers 102a-102c on rack 112 and the sensor data from the sensors 103b and/or servers 102d-102f on rack 113. The application 135 forwards the sensor data to the DG agent 106a of the SLTM system 104.

The DG agent 106a stores the sensor data in the sensor data DB 131 to be used by the SLT agent 105 to track the location of the servers 102 of the processing system 101.

A user or administrator of the data processing system 101 uploads, via application 135, an infrastructure file including infrastructure data associated with rack 112 and rack 113. The application 135 sends the infrastructure file to the SLTM system 104, which in turn, stores the infrastructure file in the infrastructure data DB 132. The infrastructure data includes a mapping of (1) a network address of network switch 122 to (2) a plurality of port identifiers of the network switch 122 to (3) a plurality of slot identifiers of rack 112 to (4) a plurality of location identifiers of the slots. For example, as shown in FIG. 1, a first row of the infrastructure data includes a mapping of the network address of network switch 122 (e.g., SW1-NA) to the port identifier of port 1 of the network switch 122 to a slot identifier of slot 1 of rack 112 (e.g., Rack-Slot1) to a location identifier of slot 1. The location identifier may indicate a position and order of the slot relative to other slots in the rack 112, a position (e.g., north-west corner, south-east corner, room center, etc.) of the rack 112 in the data processing system 101, and/or a global positioning satellite (GPS) location of the rack 112.

The infrastructure file may also include a list of the network addresses to devices (e.g., servers 102, sensors 103a, sensors 103b, network switch 122, network switch 123, etc.) in the data processing system 101 and their associated data type identifier (e.g., server name, switch name, etc.). For example, the infrastructure file may include a first mapping of the network address of the server 102*a* to a first identifier indicting that this device is a server, a second mapping of the network address of the server 102*b* to a second identifier indicting that this device is a server, a third mapping of the network address of the network switch 122 to a third identifier indicting that this device is a network switch, and so on.

In some embodiments, the script that is installed on any of the servers in a rack may further be configured to periodically query the network switch of the rack for the network addresses (e.g., MAC address and/or IP address) of each of the devices (e.g., servers 102, sensors 103*a*) that are coupled to the ports of the network switch. For example, the script that is installed on server 102*a* in rack 112 may further be configured to periodically query the network switch 122 for the network addresses of the server (e.g., server 102*a*) in slot 1, the server in slot 2 (e.g., server 102*b*), the server (e.g., server 102*c*) in slot 3, and the sensors 103*a* in slots 4 and beyond. Likewise, the script that is installed on server 102*d* in rack 113 may further be configured to periodically query the network switch 123 for the network addresses of the server (e.g., server 102*d*) in slot 1, the server in slot 2 (e.g., server 102*e*), the server (e.g., server 102*f*) in slot 3, and the sensors 103*b* in slots 4 and beyond. The scripts each generate a network address-to-port mapping and send the mappings to the SLTM system 104, or to the control system 114 which then forwards to the SLTM system 104. The SLTM system 104 stores the network address-to-port mappings in the network address port mappings DB 133.

Thus, as shown in FIG. 1, the network address port mappings DB 133 includes a first mapping of the network address of network switch 122 (e.g., SW1-NA) to the port identifier of port 1 of the network switch 122 to the network address of server 102*a* (e.g., NA1); a second mapping of the network address of network switch 122 (e.g., SW1-NA) to the port identifier of port 2 of the network switch 122 to the network address of server 102*b* (e.g., NA2); a third mapping of the network address of network switch 122 (e.g., SW1-NA) to the port identifier of port 3 of the network switch 122 to the network address of server 102*c* (e.g., NA3); a fourth mapping of the network address of network switch 122 (e.g., SW1-NA) to the port identifier of port 4 of the network switch 122 to the network address of sensor 103 (e.g., NA3), and so on.

If an administrator were to rearrange any of the servers 102 and/or sensors 103*a*, then SLTM system 104 may update the network address port mappings DB 133 to reflect this rearrangement. For example, the SLTM system 104 may re-query the data processing system 101 for the updated network address port mappings and/or the scripts may push this information to the SLTM system 104.

The SLT agent 105 may be configured to receive a request (shown in FIG. 1 as SL map request) from the application 135 executing on the control system 114 for SL map data that indicates the server locations for the servers 102 in racks 112, rack 113 and sensor data associated with the servers 102. The SLT agent 105 queries the data processing system 101 to acquire the network addresses of the servers of the SLT agent 105. For example, the SLT agent 105 extracts the network address of the network switch 122 and the network address of the network switch 123 from the infrastructure data. The SLT agent 105 uses, from the network address port mappings DB 133, the network address of the network switch 122 to retrieve a network address table that is locally stored on the network switch 122, where the network address table includes the network addresses of each server 102 that is coupled to the ports of the network switch 122. The SLT agent 105 uses, from the network address port mappings DB 133, the network address of the network switch 123 to retrieve a network address table that is locally stored on the network switch 123, where the network address table includes the network addresses of each server 102 that is coupled to the ports of the network switch 123.

The SLT agent 105 may use the infrastructure data and the network addresses of the servers 102 to identify one or more DPS locations of the servers 102 (sometimes referred to as a first group of servers) on rack 112 and the servers 102 (sometimes referred to as a second group of servers) on rack 113. For example, the SLT agent 105 compares the infrastructure data and the network addresses to determine that: (1) the server 102*a* is positioned in slot 1 of rack 112 because the network address of server 102*a* is associated with slot 1 of rack 112, (2) the server 102*b* is positioned in slot 2 of rack 112 because the network address of server 102*b* is associated with slot 2 of rack 112, (3) the server 102*c* is positioned in slot 3 of rack 112 because the network address of server 102*c* is associated with slot 3 of rack 112, (4) the server 102*d* is positioned in slot 1 of rack 113 because the network address of server 102*d* is associated with slot 1 of rack 113, (5) the server 102*e* is positioned in slot 2 of rack 113 because the network address of server 102*e* is associated with slot 2 of rack 113, and (6) the server 102*f* is positioned in slot 3 of rack 113 because the network address of server 102*f* is associated with slot 3 of rack 113. The DPS location (sometimes referred to as a location identifier) may indicate a position and order of a slot in a rack relative to other slots in the rack, a position (e.g., north-west corner, south-east corner, room center, etc.) of the rack in the data processing system 101, and/or a global positioning satellite (GPS) location of the rack.

The SLT agent 105 may use the one or more DPS locations of the servers 102 to generate a server location map (shown in FIG. 1 as SL map data) and store the server location map in the server location map DB 134. The server location map indicates the location for each server 102 in the data processing system 101. The server location map indicates an association between the servers 102*a-c* of rack 112 with the sensor data (sometimes referred to as first sensor data) that is generated by sensors 103*a* and the servers 102*d-f* of rack 113 with the sensor data (sometimes referred to as second sensor data) that is generated by sensors 103*b*. The SLT agent 105 sends the server location map to the control system 114, which in turn, presents the server location map on a display 140. When presented, the server location map depicts a map of the data processing system 101. Server icons (e.g., symbols, images) corresponding to each server 102 of the data processing system 101 is depicted on the map to show the location of the servers 102 and their associated sensor data.

An administrator or technician of the data processing system 101 may determine that a server is performing poorly due to its particular location in the data processing system 101. For example, the administrator may determine that server 102*b* in slot 2 of rack 112 is performing poorly because it is exposed to the excessive heat generated by two neighboring servers (e.g., server 102*a* in slot 1 of rack 112 and server 102*c* in slot 3 of rack 112). The administrator also may determine that server 102*d* in slot 1 of rack 113 is more equipped to tolerate the excessive heat generated by two neighboring servers than server 102*b* because, for example, the tasks allocated to server 102*b* are more CPU-intensive than tasks allocated to server 102d. The administrator may also determine that slot 1 of rack 113 is an improved environment for server 102b to operate because slot 1 of rack 113 only has a single neighboring server (e.g., server 102e). Therefore, as shown in FIG. 1, the administrator moves server 102b from slot 2 of rack 112 to slot 1 of rack 113 and server 102d from slot 1 of rack 113 to slot 2 of rack 112. The administrator also connects the server 102b to port 1 of the network switch 123 and server 102d to port 2 of the network switch 122.

The administrator may perform a similar analysis to determine that it is best, as shown in FIG. 1, to move server 102c from slot 3 of rack 112 to slot 3 of rack 113 and server 102f from slot 3 of rack 113 to slot 3 of rack 112. The administrator also connects the server 102c to port 3 of the network switch 123 and server 102f to port 3 of the network switch 122.

The SLTM system 104 may generate configuration data for a server 102 based on the location (e.g., slot number, slot position, rack position, etc.) of the server in the data processing system 101. The SLTM system 104 may send the configuration data to the server 102 to cause the server 102 to be configured or adjusted based on the configuration data, so to optimize the server 102 based on its position in the data processing system 101. If the SLTM system 104 determines that one or more servers have been rearranged by a technician, then the SLTM system 104 may re-generate the configuration data based on their updated locations and send the updated configuration data to the servers to reconfigure the servers. Thus, the SLTM system continuously monitors the servers 102 of the data processing system 101 to track their performance and locations, and reconfigures the servers if they are move to other locations in the data processing system 101, so to ensure that the servers 102 are able to perform optimally and efficiently.

Each rack includes a group of network address (NA) broadcast buttons 115 (e.g., NA broadcast button 115a, NA broadcast button 115b) that are each respectively associated with a single server 102 and configured to send a broadcast message including the network address (e.g., MAC and/or IP address) of the single server 102 in response to being pressed (e.g., activated, enabled) by a user. For example, with respect to rack 112, a first NA broadcast button 115a causes the server (e.g., server 102a) in slot 1 to send a broadcast message including the network address of the server when the button is pressed, a second NA broadcast button 115a causes the server (e.g., server 102b) in slot 2 to send a broadcast message including the network address of the server when the button is pressed, and a third NA broadcast button 115a causes the server (e.g., server 102c) in slot 3 to send a broadcast message including the network address of the server when the button is pressed. Likewise, with respect to rack 113, a first NA broadcast button 115b causes the server (e.g., server 102d) in slot 1 to send a broadcast message including the network address of the server when the button is pressed, a second NA broadcast button 115b causes the server (e.g., server 102e) in slot 2 to send a broadcast message including the network address of the server when the button is pressed, and a third NA broadcast button 115b causes the server (e.g., server 102f) in slot 3 to send a broadcast message including the network address of the server when the button is pressed. Thus, pressing any of the NA broadcast buttons 115 causes only a single server 102 to broadcast its network address to the SLTM system 104 and/or the control system 114.

In some embodiments, the SLT agent 105 may use the information included in the broadcast message to identify a DPS location of a server 102 on rack 112 or a server 102 on rack 113. For example, a user may configure the application 135 to enter into a "listening" mode to listen for a broadcast message. The user informs the application 135 that the broadcast message will be sent from a specific slot on a rack. Upon receiving the broadcast message, the application 135 extracts the network address from the broadcast message and determines, using the infrastructure data DB 132 and/or the network address port mapping DB 133, that the server corresponding to the received network address is positioned in that slot of the rack. In some embodiments, the application 135 may forward the information to the SLTM system 104 for the SLTM system 104 to determine the server positioning. The forwarded information includes the received network address, an indication that the application 135 received the network address while in the listening mode, and an identifier to the specific slot on the rack that was provided by the user.

The SLT agent 105 may also use the broadcast button to determine that the received network address does not match the network address in any of the databases, thereby indicating that the server corresponding to the network has moved to another slot in the same rack, a slot of another rack, or has been decommissioned (e.g., removed from the data processing system 101).

A data processing system 101 may be any type of environment used for the processing and reporting of structured and semi-structured data from multiple sources, including for example, one or more database servers, a data warehouse, a virtual warehouse, a data lake, a data pond, a data mesh, and/or the like.

In some embodiments, a data processing system 101 may be a modular data center system, which is a portable method of deploying data center capacity. A modular data center can be placed in any environment (e.g., near an industrial park, near a group of customers, etc.) that demands data capacity and data processing. A modular data center system may consist of purpose-engineered modules and components to offer scalable data center capacity with multiple power connections, network connections, and cooling options (e.g., radiator coils, water connections). Modules can be shipped to be added, integrated or retrofitted into an existing data center or combined into a system of modules. In some embodiments, the modular data center may be any type of vehicle that is capable of moving.

A communication network (e.g., communication network 121 and/or a private network within the data processing system 101) may include a wired or a wireless infrastructure, which may be provided by one or more wireless communications systems, such as wireless fidelity (Wi-Fi) connectivity to the communication network and/or a wireless carrier system that can be implemented using various data processing equipment, communication towers (e.g., cell towers), etc. The communication network may carry communications (e.g., data, message, packets, frames, etc.) between any other the computing device.

The SLTM system 104, server 102, and control system 114 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

The server 102 may be configured to process any type of data including, for example, database data, application data, files, computer code, blockchain data, cryptocurrency data, and/or the like. The server 102 may be configured to perform any type of calculations including, for example, hash calculations.

Still referring to FIG. 1, the SLTM system 104 acquires infrastructure data associated with a data process system (DPS) that includes a first group of servers being monitored by a first group of sensors that generate a first set of sensor data and a second group of servers being monitored by a second group of sensors that generate a second set of sensor data. The SLTM system 104 queries the DPS to acquire a plurality of network addresses associated with the first group of servers and the second group of servers. The SLTM system 104 identifies, by a processing device based on the infrastructure data and the plurality of network addresses, a plurality of DPS locations of the first group of servers and the second group of servers. The SLTM system 104 generates, based on the plurality of DPS locations, a server location map of the first group of servers and the second group of servers in the DPS, the server location map associates the first group of servers with the first set of sensor data and the second group of servers with the second set of sensor data.

Although FIG. 1 shows only a select number of computing devices (e.g., SLTM system 104, servers 102, control system 114) and data processing system 101; the environment 100 may include any number of computing devices and data processing systems that are interconnected in any arrangement to facilitate the exchange of data between the computing devices and the private network systems.

FIG. 2A is a block diagram depicting an example of the server location tracking management system of the environment in FIG. 1, according to some embodiments. While various devices, interfaces, and logic with particular functionality are shown, it should be understood that the SLTM system 104 includes any number of devices and/or components, interfaces, and logic for facilitating the functions described herein. For example, the activities of multiple devices may be combined as a single device and implemented on the same processing device (e.g., processing device 202a), as additional devices and/or components with additional functionality are included.

The SLTM system 104 includes a processing device 202a (e.g., general purpose processor, a PLD, etc.), which may be composed of one or more processors, and a memory 204a (e.g., synchronous dynamic random-access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device

202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202, controls the operations of the SLTM system 104. In some embodiments, the processing device 202a and the memory 204a form various processing devices and/or circuits described with respect to the SLTM 104. The instructions include code from any suitable computer programming language such as, but not limited to, C, C++, C #, Java, JavaScript, VBScript, Perl, HTML, XML, Python, TCL, and Basic.

The processing device 202a executes an SLT agent 105 and a DG agent 106a. The SLTM system 104 includes a sensor data DB 131, an infrastructure data DB 132, a network address port mappings DB 133, and a server location map DB 134. The SLT agent 105 may use any of the databases and/or the DG agent 106a to perform its operations.

The SLT agent 105 may be configured to acquire infrastructure data associated with a data process system (DPS) including a first group of servers (e.g., servers 102a-102c) being monitored by a first group of sensors (e.g., sensors 103a) that generate a first set of sensor data and a second group of servers (e.g., servers 102d-102f) being monitored by a second group of sensors (e.g., sensors 103b) that generate a second set of sensor data. The SLT agent 105 may be configured to query the DPS to acquire a plurality of network addresses associated with the first group of servers and the second group of servers. The SLT agent 105 may be configured to identify, based on the infrastructure data and the plurality of network addresses, a plurality of DPS locations of the first group of servers and the second group of servers. The SLT agent 105 may be configured to generate, based on the plurality of DPS locations, a server location map of the first group of servers and the second group of servers in the DPS, the server location map associates the first group of servers with the first set of sensor data and the second group of servers with the second set of sensor data.

The SLT agent 105 may be configured to receive the first set of sensor data and the second set of sensor data from a local control system that executes an application to gather the first set of sensor data and the second set of sensor data from the DPS and forward the first set of sensor data and the second set of sensor data to the DPS.

The SLT agent 105 may be configured to determine, based on the plurality of DPS locations, a relocation of a first server of the first group of servers to cause the first server to join the second group of servers. The SLT agent 105 may be configured to re-generate the server location map to indicate the relocation of the first server of the first group of servers to cause the first server to join the second group of servers.

The SLT agent 105 may be configured to re-associate the first server from the first group of sensors to the second group of sensors responsive to determining the relocation of the first server. In some embodiments, the SLT agent 105 may re-associate the first server by configuring the first group of sensors to further monitor a performance of the first server. In some embodiments, the SLT agent 105 may re-associate the first server by re-associating the first server to the second set of sensor data instead of the first set of sensor data. In some embodiments, the server location map further indicates that the first server is associated with the second set of sensor data instead of the first set of sensor data.

The SLT agent 105 may be configured to, prior to determining the relocation of the first server of the first group of servers generate configuration data for the first server of the first group of servers based on the first set of sensor data and provide the configuration data to the first server to cause the first server to be adjusted based on the configuration data.

The SLT agent 105 may be configured to, responsive to determining the relocation of the first server of the first group of servers, generate additional configuration data for the first server of the first group of servers based on the second set of sensor data, and provide the additional configuration data to the first server to cause the first server to be adjusted based on the additional configuration data.

The SLT agent 105 may be configured to preconfigure the first server based on the second set of sensor data responsive to determining the relocation of the first server of the first group of servers. In some embodiments, the second group of sensors generated the second set of sensor data based on the second group of servers and without monitoring the first server.

In some embodiments, a first portion of the plurality of DPS locations respectively correspond to a first group of rack slots of a first server rack associated with the first group of servers. In some embodiments, a second portion of the plurality of DPS locations respectively correspond to a second group of rack slots of a second server rack associated with the second group of servers.

The SLT agent 105 may be configured to determine, based on the plurality of DPS locations, the relocation of the first server of the first group of servers to cause the first server to join the second group of servers by receiving, from an application executing a local control system, a message indicating that the application received: a request to listen for a broadcast message to be sent from a current server that is coupled to a second port of a plurality of ports of a second network switch, and the broadcast message indicating that a current network address of the current server corresponds to a first network address of the first server; and determine, based on the broadcast message, that the current server corresponds to the first server.

In some embodiments, the first group of servers is coupled to a first network switch and the second group of servers is coupled to a second network switch. In some embodiments, the infrastructure data includes a first mapping of a plurality of ports of the first network switch to a first group of location identifiers that respectively correspond to a first portion of the plurality of DPS locations. In some embodiments, the infrastructure data includes a second mapping of a plurality of ports of the second network switch to a second group of location identifiers that respectively correspond to a second portion of the plurality of DPS locations.

The SLT agent 105 may be configured to identify, based on the infrastructure data and the plurality of network addresses, the plurality of DPS locations of the first group of servers and the second group of servers by determining that a first set of network addresses corresponding to the first group of servers is included in a first network address table of the first network switch; and determining that a second set of network identifiers corresponding to the second group of servers is included in a second network address table of the second network switch.

In some embodiments, each of the first group of sensors and the second group of sensors include at least one of a temperature sensor, a power sensor, or an airflow sensor.

The SLTM system 104 includes a network interface 206a configured to establish a communication session with a computing device for sending and receiving data over the communication network 121 to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the SLTM system 104 includes a plurality of network interfaces 206a of different types, allowing for connections to a variety of networks, such as local area networks (public or private) or wide area networks including the Internet, via different sub-networks.

The SLTM system 104 includes an input/output device 205a configured to receive user input from and provide information to a user. In this regard, the input/output device 205a is structured to exchange data, communications, instructions, etc. with an input/output component of the SLTM system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the SLTM system 104, such as a built-in display, touch screen, microphone, etc., or external to the housing of the SLTM system 104, such as a monitor connected to the SLTM system 104, a speaker connected to the SLTM system 104, etc., according to various embodiments. In some embodiments, the SLTM system 104 includes communication circuitry for facilitating the exchange of data, values, messages, and the like between the input/output device 205a and the components of the SLTM system 104. In some embodiments, the input/output device 205a includes machine-readable media for facilitating the exchange of information between the input/output device 205a and the components of the SLTM system 104. In still another embodiment, the input/output device 205a includes any combination of hardware components (e.g., a touchscreen), communication circuitry, and machine-readable media.

The SLTM system 104 includes a device identification component 207a (shown in FIG. 2A as device ID component 207a) configured to generate and/or manage a device identifier associated with the SLTM system 104. The device identifier may include any type and form of identification used to distinguish the SLTM system 104 from other computing devices. In some embodiments, to preserve privacy, the device identifier may be cryptographically generated, encrypted, or otherwise obfuscated by any device and/or component of the SLTM system 104. In some embodiments, the SLTM system 104 may include the device identifier in any communication (e.g., config data, SL map data, etc.) that the SLTM system 104 sends to a computing device.

The SLTM system 104 includes a bus (not shown), such as an address/data bus or other communication mechanism for communicating information, which interconnects the devices and/or components of the SLTM system 104, such as processing device 202a, network interface 206a, input/output device 205a, and device ID component 207a.

In some embodiments, some or all of the devices and/or components of SLTM system 104 may be implemented with the processing device 202a. For example, the SLTM system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the control system of the environment in FIG. 1, according to some embodiments. While various devices, interfaces, and logic with particular functionality are shown, it should be understood that the control system 114 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The control system 114 includes a processing device 202b (e.g., general purpose processor, a PLD, etc.), which may be composed of one or more processors, and a memory 204b (e.g., synchronous dynamic random-access memory (DRAM), read-only memory (ROM)), which may communicate with each other via a bus (not shown). The processing device 202b includes identical or nearly identical functionality as processing device 202a in FIG. 2a, but with respect to devices and/or components of the control system 114 instead of devices and/or components of the SLTM system 104.

The memory 204b of processing device 202b stores data and/or computer instructions/code for facilitating at least some of the various processes described herein. The processing device 202b includes identical or nearly identical functionality as processing device 202a in FIG. 2a, but with respect to devices and/or components of the control system 114 instead of devices and/or components of the SLTM system 104.

The processing device 202a may be configured to an application 135 and a DG agent 106b. The application 135 uses the DG agent 106b to acquire (e.g., receive or retrieve) the sensor data from the sensors 103a and/or servers 102a-102c on rack 112 and the sensor data from the sensors 103b and/or servers 102d-102f on rack 113. The application 135 forwards the sensor data to the DG agent 106a of the SLTM system 104.

The application 135 may receive an infrastructure file from a user, where the file includes infrastructure data that is associated with the devices and racks of the data processing system 101. The file may also include a layout of the data processing system 101. The application 135 sends the infrastructure file to the SLTM system 104, which in turn, stores the infrastructure file in the infrastructure data DB 132.

The application 135 may be configured to send a request (shown in FIG. 1 as SL map request) to the SLTM system 104 for SL map data associated with the data processing system 101. The SL map request may request for the SL map data to include the server locations for the servers 102 in racks 112, rack 113 and the sensor data that is associated with the servers 102.

The control system 114 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the control system 114 instead of devices and/or components of the SLTM system 104.

The control system 114 includes an input/output device 205b configured to receive user input from and provide information to a user. In this regard, the input/output device 205b is structured to exchange data, communications, instructions, etc. with an input/output component of the control system 114. The input/output device 205b includes identical or nearly identical functionality as input/output device 205a in FIG. 2A, but with respect to devices and/or components of the control system 114 instead of devices and/or components of the SLTM system 104.

The control system 114 includes a device identification component 207b (shown in FIG. 2B as device ID component 207b) configured to generate and/or manage a device identifier associated with the control system 114. The device ID component 207b includes identical or nearly identical functionality as device ID component 207a in FIG. 2A, but with respect to devices and/or components of the control system 114 instead of devices and/or components of the SLTM system 104.

The control system 114 includes a bus (not shown), such as an address/data bus or other communication mechanism for communicating information, which interconnects the devices and/or components of the control system 114, such as processing device 202b, network interface 206b, input/output device 205b, and device ID component 207b.

In some embodiments, some or all of the devices and/or components of the control system 114 may be implemented with the processing device 202b. For example, the control system 114 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

FIG. 3 is a flow diagram depicting a method of managing configurations of rearranged servers in a data processing system, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, one or more (or all) blocks of method 300 may be performed by a server location tracking management system, such as the SLTM system 104 in FIG. 1. In some embodiments, one or more (or all) blocks of method 300 may be performed by one or more servers 102 of a data processing system 101, such as data processing system 101 in FIG. 1. In some embodiments, one or more (or all) blocks of method 300 may be performed a computing device that is separate from the data processing system 101, such as control system 114 in FIG. 1

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

The method 300 includes the block 302 of acquiring infrastructure data associated with a DPS including a first group of servers being monitored by a first group of sensors that generate a first set of sensor data and a second group of servers being monitored by a second group of sensors that generate a second set of sensor data. The method 300 includes the block 304 of querying the DPS to acquire a plurality of network addresses associated with the first group of servers and the second group of servers. The method 300 includes the block 306 of identifying, by a processing device based on the infrastructure data and the plurality of network addresses, a plurality of DPS locations of the first group of servers and the second group of servers. The method 300 includes the block 308 of generating, based on the plurality of DPS locations, a server location map of the first group of servers and the second group of servers in the DPS, the server location map associates the first group of servers with the first set of sensor data and the second group of servers with the second set of sensor data.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general-purpose processor, a PLD, etc.) 402, a main memory 404 (e.g., synchronous dynamic random-access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components/programs/applications 442 (e.g., SLT agent 105, DG agent 106*a*, DG agent 106*b*, application 135 in FIG. 1, etc.) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "acquiring," "querying," "identifying," "generating," "receiving," "re-generating," "preconfiguring," "deploying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:

acquiring infrastructure data associated with a data process system (DPS) comprising a first group of servers being monitored by a first group of sensors that generate a first set of sensor data and a second group of servers being monitored by a second group of sensors that generate a second set of sensor data;

querying the DPS to acquire a plurality of network addresses associated with the first group of servers and the second group of servers;

identifying, by a processing device based on the infrastructure data and the plurality of network addresses, a plurality of DPS locations of the first group of servers and the second group of servers;

generating, based on the plurality of DPS locations, a server location map of the first group of servers and the second group of servers in the DPS, the server location map associates the first group of servers with the first set of sensor data and the second group of servers with the second set of sensor data;

determining, based on the plurality of DPS locations, a relocation of a first server of the first group of servers to cause the first server to join the second group of servers;

re-generating the server location map to indicate the relocation of the first server of the first group of servers to cause the first server to join the second group of servers; and re-associating the first server from the first group of sensors to the second group of sensors responsive to determining the relocation of the first server, wherein the server location map further indicates that the first server is associated with the second set of sensor data instead of the first set of sensor data.

2. The method of claim 1, further comprising:

receiving the first set of sensor data and the second set of sensor data from a local control system that executes an application to gather the first set of sensor data and the second set of sensor data from the DPS and forward the first set of sensor data and the second set of sensor data to the processing device.

3. The method of claim 1, further comprising:

prior to determining the relocation of the first server of the first group of servers, generating configuration data for the first server of the first group of servers based on the first set of sensor data; and providing the configuration data to the first server to cause the first server to be adjusted based on the configuration data; and responsive to determining the relocation of the first server of the first group of servers, generating additional configuration data for the first server of the first group of servers based on the second set of sensor data; and providing the additional configuration data to the first server to cause the first server to be adjusted based on the additional configuration data.

4. The method of claim 1, further comprising:

preconfiguring the first server based on the second set of sensor data responsive to determining the relocation of the first server of the first group of servers, wherein the second group of sensors generated the second set of sensor data based on the second group of servers and without monitoring the first server.

5. The method of claim 1, wherein a first portion of the plurality of DPS locations respectively correspond to a first group of rack slots of a first server rack associated with the first group of servers, and wherein a second portion of the plurality of DPS locations respectively correspond to a second group of rack slots of a second server rack associated with the second group of servers.

6. The method of claim 1, wherein determining, based on the plurality of DPS locations, the relocation of the first server of the first group of servers to cause the first server to join the second group of servers further comprises:

receiving, from an application executing a local control system, a message indicating that the application received:

a request to listen for a broadcast message to be sent from a current server that is coupled to a second port of a plurality of ports of a second network switch, and the broadcast message indicating that a current network address of the current server corresponds to a first network address of the first server; and determining, based on the broadcast message, that the current server corresponds to the first server.

7. The method of claim 1, wherein the first group of servers is coupled to a first network switch and the second group of servers is coupled to a second network switch;

the infrastructure data comprises a first mapping of a plurality of ports of the first network switch to a first group of location identifiers that respectively correspond to a first portion of the plurality of DPS locations; and the infrastructure data comprises a second mapping of a plurality of ports of the second network switch to a second group of location identifiers that respectively correspond to a second portion of the plurality of DPS locations.

8. The method of claim 7, wherein identifying, by the processing device based on the infrastructure data and the plurality of network addresses, the plurality of DPS locations of the first group of servers and the second group of servers further comprises:

determining that a first set of network addresses corresponding to the first group of servers is included in a first network address table of the first network switch; and determining that a second set of network identifiers corresponding to the second group of servers is included in a second network address table of the second network switch.

9. The method of claim 1, wherein each of the first group of sensors and the second group of sensors include at least one of a temperature sensor, a power sensor, or an airflow sensor.

10. A system comprising:

a memory; and a processing device, operatively coupled to the memory, to:

acquire infrastructure data associated with a data process system (DPS) comprising a first group of servers being monitored by a first group of sensors that generate a first set of sensor data and a second group of servers being monitored by a second group of sensors that generate a second set of sensor data;

query the DPS to acquire a plurality of network addresses associated with the first group of servers and the second group of servers;

identify, based on the infrastructure data and the plurality of network addresses, a plurality of DPS locations of the first group of servers and the second group of servers;

generate, based on the plurality of DPS locations, a server location map of the first group of servers and the second group of servers in the DPS, the server location map associates the first group of servers with the first set of sensor data and the second group of servers with the second set of sensor data;

determine, based on the plurality of DPS locations, a relocation of a first server of the first group of servers to cause the first server to join the second group of servers;

re-generate the server location map to indicate the relocation of the first server of the first group of servers to cause the first server to join the second group of servers; and re-associate the first server from the first group of sensors to the second group of sensors responsive to determining the relocation of the first server, wherein the server location map further indicates that the first server is associated with the second set of sensor data instead of the first set of sensor data.

11. The system of claim 10, wherein the processing device is further to:

receive the first set of sensor data and the second set of sensor data from a local control system that executes an application to gather the first set of sensor data and the second set of sensor data from the DPS and forward the first set of sensor data and the second set of sensor data to the processing device.

12. The system of claim 10, wherein the processing device is further to:

prior to determining the relocation of the first server of the first group of servers, generate configuration data for the first server of the first group of servers based on the first set of sensor data; and provide the configuration data to the first server to cause the first server to be adjusted based on the configuration data;

responsive to determining the relocation of the first server of the first group of servers, generate additional configuration data for the first server of the first group of servers based on the second set of sensor data; and provide the additional configuration data to the first server to cause the first server to be adjusted based on the additional configuration data.

13. The system of claim 10, wherein the processing device is further to:

preconfigure the first server based on the second set of sensor data responsive to determining the relocation of the first server of the first group of servers, wherein the second group of sensors generated the second set of sensor data based on the second group of servers and without monitoring the first server.

14. The system of claim 10, wherein a first portion of the plurality of DPS locations respectively correspond to a first group of rack slots of a first server rack associated with the first group of servers, and wherein a second portion of the plurality of DPS locations respectively correspond to a second group of rack slots of a second server rack associated with the second group of servers.

15. The system of claim 10, wherein to determine, based on the infrastructure data, the relocation of the first server of the first group of servers to cause the first server to join the second group of servers, the processing device is further to:

receive, from an application executing a local control system, a message indicating that the application received:

a request to listen for a broadcast message to be sent from a current server that is coupled to a second port of the plurality of ports of a second network switch, and the broadcast message indicating that a current network address of the current server corresponds to a first network address of the first server; and determine, based on the broadcast message, that the current server corresponds to the first server.

16. The system of claim 10, wherein the processing device is further to:

the first group of servers is coupled to a first network switch and the second group of servers is coupled to a second network switch;

the infrastructure data comprises a first mapping of a plurality of ports of the first network switch to a first group of location identifiers that respectively correspond to a first portion of the plurality of DPS locations; and the infrastructure data comprises a second mapping of a plurality of ports of the second network switch to a second group of location identifiers that respectively correspond to a second portion of the plurality of DPS locations.

17. The system of claim 16, wherein to identify, by the processing device based on the infrastructure data and the plurality of network addresses, the plurality of DPS locations of the first group of servers and the second group of servers, the processing device is further to:

determine that a first set of network addresses that correspond to the first group of servers is included in a first network address table of the first network switch; and determine that a second set of network identifiers corresponding to the second group of servers is included in a second network address table of the second network switch.

18. The system of claim 10, wherein each of the first group of sensors and the second group of sensors include at least one of a temperature sensor, a power sensor, or an airflow sensor.

19. A non-transitory computer-readable medium storing instructions that, when execute by a processing device, cause the processing device to:

acquire infrastructure data associated with a data process system (DPS) comprising a first group of servers being monitored by a first group of sensors that generate a first set of sensor data and a second group of servers being monitored by a second group of sensors that generate a second set of sensor data;

query the DPS to acquire a plurality of network addresses associated with the first group of servers and the second group of servers;

identify, by the processing device and based on the infrastructure data and the plurality of network addresses, a plurality of DPS locations of the first group of servers and the second group of servers;

generate, based on the plurality of DPS locations, a server location map of the first group of servers and the second group of servers in the DPS, the server location map associates the first group of servers with the first set of sensor data and the second group of servers with the second set of sensor data;

determine, based on the plurality of DPS locations, a relocation of a first server of the first group of servers to cause the first server to join the second group of servers;

re-generate the server location map to indicate the relocation of the first server of the first group of servers to cause the first server to join the second group of servers; and re-associate the first server from the first group of sensors to the second group of sensors responsive to determining the relocation of the first server, wherein the server location map further indicates that the first server is associated with the second set of sensor data instead of the first set of sensor data.

* * * * *